United States Patent
Sato

(10) Patent No.: US 11,281,416 B2
(45) Date of Patent: Mar. 22, 2022

(54) IMAGE READING APPARATUS

(71) Applicant: BROTHER KOGYO KABUSHIKI KAISHA, Nagoya (JP)

(72) Inventor: Ryoichi Sato, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/032,325

(22) Filed: Sep. 25, 2020

(65) Prior Publication Data

US 2021/0096800 A1 Apr. 1, 2021

(30) Foreign Application Priority Data

Sep. 27, 2019 (JP) .............................. JP2019-177081

(51) Int. Cl.
 G06F 3/12 (2006.01)
 H04N 1/00 (2006.01)
(52) U.S. Cl.
 CPC .......... G06F 3/1296 (2013.01); G06F 3/1238 (2013.01); H04N 1/00005 (2013.01); H04N 1/00037 (2013.01); H04N 1/00244 (2013.01); H04N 1/00411 (2013.01)
(58) Field of Classification Search
 None
 See application file for complete search history.

(56) References Cited

U.S. PATENT DOCUMENTS

| 2009/0034723 A1* | 2/2009 | Yanazume | H04N 1/32133 380/54 |
| 2013/0235421 A1* | 9/2013 | Ono | H04N 1/0023 358/1.15 |
| 2017/0242636 A1* | 8/2017 | Minami | G06F 3/1293 |

FOREIGN PATENT DOCUMENTS

| JP | H11-027464 A | 1/1999 |
| JP | 2013-186672 A | 9/2013 |
| JP | 2014-007677 A | 1/2014 |

* cited by examiner

*Primary Examiner* — Frantz Bataille
(74) *Attorney, Agent, or Firm* — Scully, Scott, Murphy & Presser, P.C.

(57) ABSTRACT

An image reading apparatus, having a reader device, a communication interface, a user interface, and a controller is provided. The controller is configured to receive a job, including information indicating a destination of image data, from an information processing apparatus using one of a specific protocol and a protocol other than the specific protocol, in a case where the job is received by use of the protocol other than the specific protocol, cause the reader device to start reading the image, and in another case where the job is received by use of the specific protocol, record the information included in the job, and after recording the information, in response to receiving of an execution command, cause the reader device to start reading the image, obtain the destination of the image data from the recorded information, and transmit the image data for the image to the obtained destination.

10 Claims, 8 Drawing Sheets

| ID | PASSWORD | DESTINATION INFORMATION | REGISTERED DATE |
|---|---|---|---|
| 001 | **** | Predetermined folder in PC2 | 2018/03/01 09:15:45 |
| ... | ... | ... | ... |
| XXX | **** | Shared folder in server | 2018/03/31 19:45:15 |
| XXX | **** | Designated cloud server | 2018/03/31 20:30:00 |

IMAGE READING APPARATUS

CROSS REFERENCE TO RELATED APPLICATION

This application claims priority from Japanese Patent Application No. 2019-177081, filed on Sep. 27, 2019, the entire subject matter of which is incorporated herein by reference.

BACKGROUND

Technical Field

An aspect of the present disclosure is related to an image reading apparatus.

Related Art

A technic for so-called push-scanning function in an image reading system is known. The push-scanning function may enable an image reading apparatus to read an image of an original sheet, generate image data for the image being read, and transmit the generated image data automatically to an information processing apparatus designated by a user. Meanwhile, in the information processing apparatus supporting the push-scanning function, a scanner driver may be running active so that the information processing apparatus may receive the image data transmitted from the image reading apparatus through the scanner driver at all time and store the received image data in a designated storage area automatically.

SUMMARY

In recent years, a technic to control an image reading apparatus by using a standard or basic reader program incorporated generally in an operating system (OS) in an information processing apparatus, without using a scanner driver, has been introduced for practice. According to this technic, the OS may relate the image reading apparatus with the basic reader program in the OS, and once the image reading apparatus is related with the basic reader program, when the image reading apparatus receives a command for image reading from the information processing apparatus, the image reading apparatus may operate to conduct the image reading process under the control of the reader program without using the scanner driver.

Meanwhile, however, the basic reader program included in the OS may not support the push-scanning function mentioned above. Therefore, in order to input a command to cause the image reading apparatus to read an image of an original sheet from the information processing apparatus through the basic reader program in the OS, the user at the information processing apparatus may need to move to the image reading apparatus, set the original sheet on the image reading apparatus, return to the information processing apparatus to enter a start command, which may cause the image reading apparatus to start reading the image, to the image reading apparatus, and move once again to the image reading apparatus to retrieve the original sheet. In this flow of actions, the user may be troubled by moving for multiple times between the information processing apparatus and the image reading apparatus, which may be load to be reduced.

The present disclosure is advantageous in that a technic reducible of a user's load for an image reading apparatus, in which a reader program is generally installed within an OS, capable of receiving a job from an information processing apparatus, is provided.

According to an aspect of the present disclosure, an image reading apparatus, including a reader device, a communication interface, a user interface, and a controller, is provided. The controller is configured to receive a job to cause the reader device to read an image of an original from an information processing apparatus through the communication interface using one of a specific protocol and a protocol other than the specific protocol, the specific protocol being a protocol to be used in a basic reader program incorporated in an operating system in the information processing apparatus, the job including information indicating a destination of image data; in a case where the job is received by use of the protocol other than the specific protocol, cause the reader device to start reading the image; and in another case where the job is received by use of the specific protocol, record the information included in the job indicating the destination of the image data without causing the reader device to start reading the image; and after recording the information included in the job indicating the destination of the image data, in response to receiving of an execution command to execute the job through the user interface, cause the reader device to start reading the image, obtain the destination of the image data for the image having been read from the recorded information, and transmit the image data for the image to the obtained destination.

BRIEF DESCRIPTION OF THE ACCOMPANYING DRAWINGS

DETAILED DESCRIPTION

Hereinafter, with reference to the accompanying drawings, described below will be embodiments of the present disclosure. The present disclosure may be embodied by a multifunction peripheral (MFP) as an image reading apparatus and describes a scanner system, which includes the multifunction peripheral and a personal computer (PC).

Figure 1:
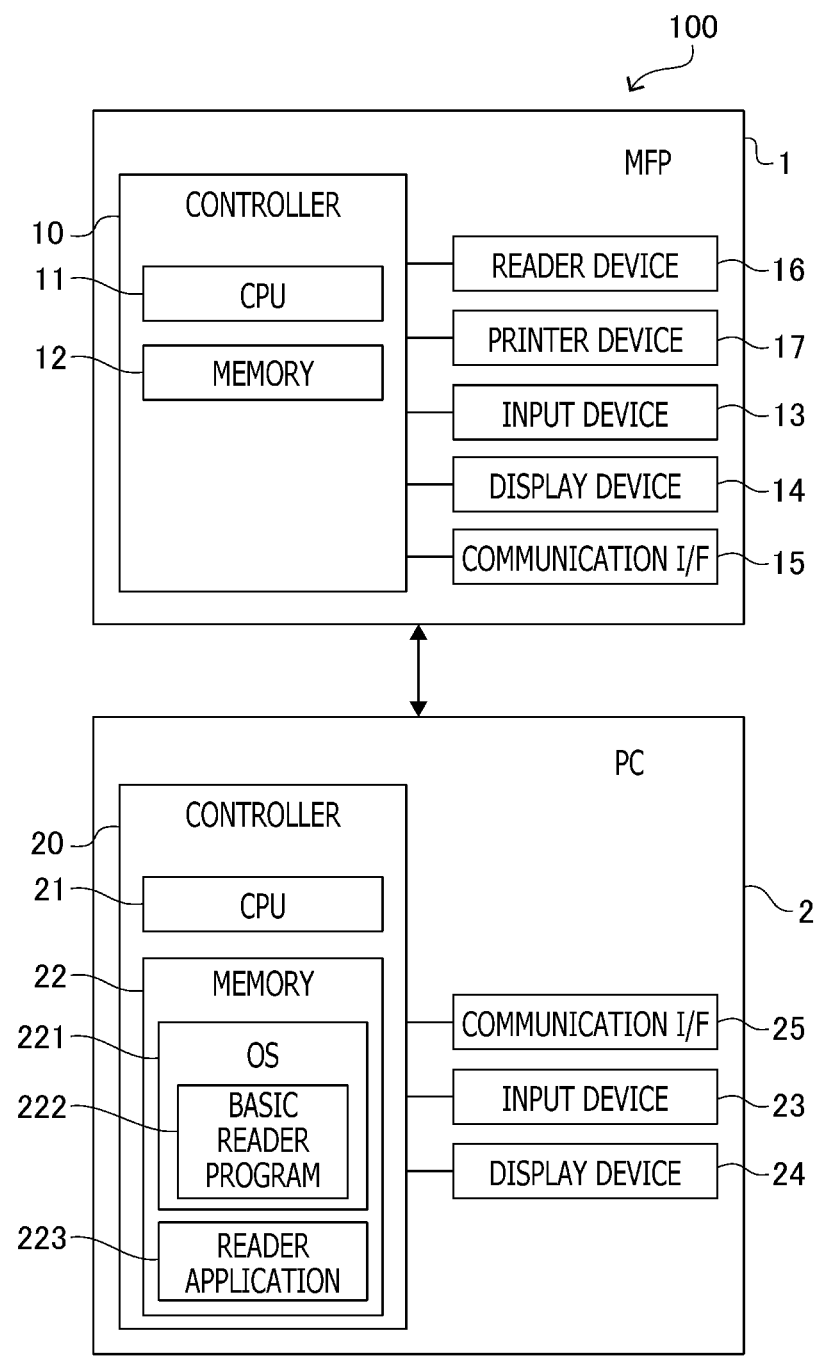
FIG. 1 is a block diagram to illustrate an electrical configuration of a scanner system including a multifunction peripheral machine (MFP) according to embodiments of the present disclosure.

A scanner system 100 according to the embodiments of the present disclosure includes an MFP 1 and a PC 2, which are connected to communicate with each other, as shown in FIG. 1. Quantity of the MFP or the PC may not necessarily be limited to one (1) for each, but the scanner system 100 may include a plurality of MFPs 1 and/or a plurality of PCs 2. Optionally, device(s) additionally to the MFP 1 and the PC 2 may be connected to the scanner system 100.

The MFP 1 has a controller 10 including a CPU 11 and a memory 12. Further, the MFP 1 has an input device 13, a display device 14, a communication interface (I/F) 15, a reader device 16, and a printer device 17, which are connected with the controller 10. The controller 10 may not necessarily be limited to a single hardware device provided to the MFP 1 but may include one or more hardware devices and software programs that are used to control actions and behaviors in the MFP 1.

The CPU 11 may execute processes according to programs called from the memory 12 and/or according to operations by a user. The memory 12 includes various types of memory devices including, for example, a ROM, a RAM, and a non-volatile memory. In the embodiment in the present disclosure, however, the types of the memory devices are not necessarily distinguished. The memory 12 may be used as a work area for the CPU 11 to process data and information and as a storage area to store data and information temporarily. Moreover, the memory 12 may be used as a storage area to store programs, data such as image data, and settings for operations.

The input device 13 may be a device, through which inputting operations by the user may be accepted, and may include buttons and switches. The display device 14 may be a device to display information and may include, for example, a liquid crystal panel. Optionally, a single device, such as a touch panel, having both the displaying function and the inputting function to serve as the input device 13 and the display device 14, may be provided.

The communication I/F 15 includes a hardware device, which enables communication with an external device such as the PC 2. Communication through the communication I/F 15 may either be wired or wireless communication and may be based on any of technical standards including, for example, Wi-Fi (registered trademark), Bluetooth (registered trademark), USB, and LAN.

The reader device 16 may include any configuration to read an image of an original, e.g., an original sheet, and obtain image data composing the image. The reader device 16 in the MFP 1 may either be a color image scanner, which may read multicolored images and obtain multicolored image data, or a monochrome image scanner, which may read multicolored or monochrome images and obtain monochrome image data.

The printer device 17 may include any configuration to form an image on a sheet. The printer device 17 may form an image in, for example, inkjet-printing, electro-photographic printing, or in any other printing technic. The printer device 17 may either be a device capable of forming multicolored images or a device capable of forming monochrome images alone.

The PC 2 in the present embodiment has a controller 20, which includes a CPU 21 and a memory 22, and is connectable with the MFP 1. The PC 2 further has an input device 23, a display device 24, and a communication I/F 25, which are electrically connected with the controller 20. The controller 20 may not necessarily be limited to a single hardware device provided to the PC 2 but may include one or more hardware devices and software programs that are used to control actions and behaviors in the PC 2.

The CPU 21 may execute processes according to programs called from the memory 22 and/or according to operations by a user. The memory 22 may be used as a work area for the CPU 21 to process data and information and as a storage area to store data and information temporarily. Moreover, the memory 22 may be used as a storage area to store programs, data such as image data, and settings for operations. For example, the memory 22 may store an OS 221 and a scanner application 223, which is an application program to control a scanner. The reader application 223 may receive input of a read command to the scanner and transmit the read command to a specified scanner, e.g., the MFP 1. Optionally, the reader application 223 may have a function to display image data obtained from the scanner.

The input device 23 may be a device, through which inputting operations by the user may be entered, and may include a keyboard and/or a mouse. The display device 24 may be a device to display information and may include, for example, a liquid crystal panel. Optionally, a single device, such as a touch panel, having both the displaying function and the inputting function to serve as the input device 23 and the display device 24, may be provided.

The communication I/F 25 may include a hardware device, which enables communication with an external device such as the MFP 1. Communication through the communication I/F 25 may either be wired or wireless communication and may be based on any of technical standards including, for example, Wi-Fi (registered trademark), Bluetooth (registered trademark), USB, and LAN.

In recent years, a so-called driverless reading technology, which enables transmission of a read command from one apparatus to another apparatus, e.g., from a PC to a scanner, without installing a printer driver in the PC while an OS in the PC includes a basic reader program, has been introduced. The basic reader program included in the OS installed in the PC may provide a reading function, which enables the PC to accept input of the read command. In the PC 2 in the present embodiment, as shown in FIG. 1, the OS 221 including a basic reader program 222 is installed in the memory 22. The OS 221 may be, for example, Windows (registered trademark), MacOS (registered trademark), or Linux (registered trademark). The basic reader program 222 may be a basic program to execute processes that are related to reading of images and may be adapted to operate with multiple models of scanners provided by multiple manufacturers. The basic reader program 222 may be, for example, AirScan (registered trademark.)

In order to cause a scanner or a reader apparatus to read an image by the read command through the basic reader program 222, it is necessary that the apparatus is registered by the OS 221. Therefore, when the PC 2 receives a registration command to register a new apparatus in the OS 221, the PC 2 may output a search signal to search for the new apparatus connectable with the PC 2 and, when the PC 2 receives a reply from the new apparatus, the PC 2 may output an inquiry signal for information concerning ability of the new apparatus. The apparatus replying to the inquiry correctly is allowed to be registered in the OS 221. The commands from the basic reader program 222 may be output in accordance with Internet Printing Protocol (IPP).

Once the MFP 1 is registered in the OS 221, for example, the reader application 223 may receive a read command, which may cause the MFP 1 to read an image, from the basic reader program 222. The reader application 223 receiving the read command from the basic reader program 222 may return a scan job based on the read command to the basic reader program 222. As the scan job from the reader application 223 is input in the basic reader program 222, the basic reader program 222 may transmit the scan job from the PC 2 to the MFP 1 by use of IPP. The MFP 1 receiving the scan job may generate image data and return the image data to the PC 2.

Meanwhile, the basic reader program 222 may not necessarily be open to receive the image data from the MFP 1 at all time. In other words, the basic program 222 in the PC 2 may not support a push-scanning function, which requires running of a resident program enabling receiving of the image data from the MFP 1. In this regard, the scanner system 100 in the present embodiments controls the MFP 1 so that the MFP 1 may process the scan job input through the basic reader program 222 in a push-scanning-like manner. In other words, the MFP 1 may provide a quasi-push-scanning function for the scan job input through the basic reader program 222. First and second embodiments of the scanner system 100 will be described below.

First Embodiment

Figure 2:
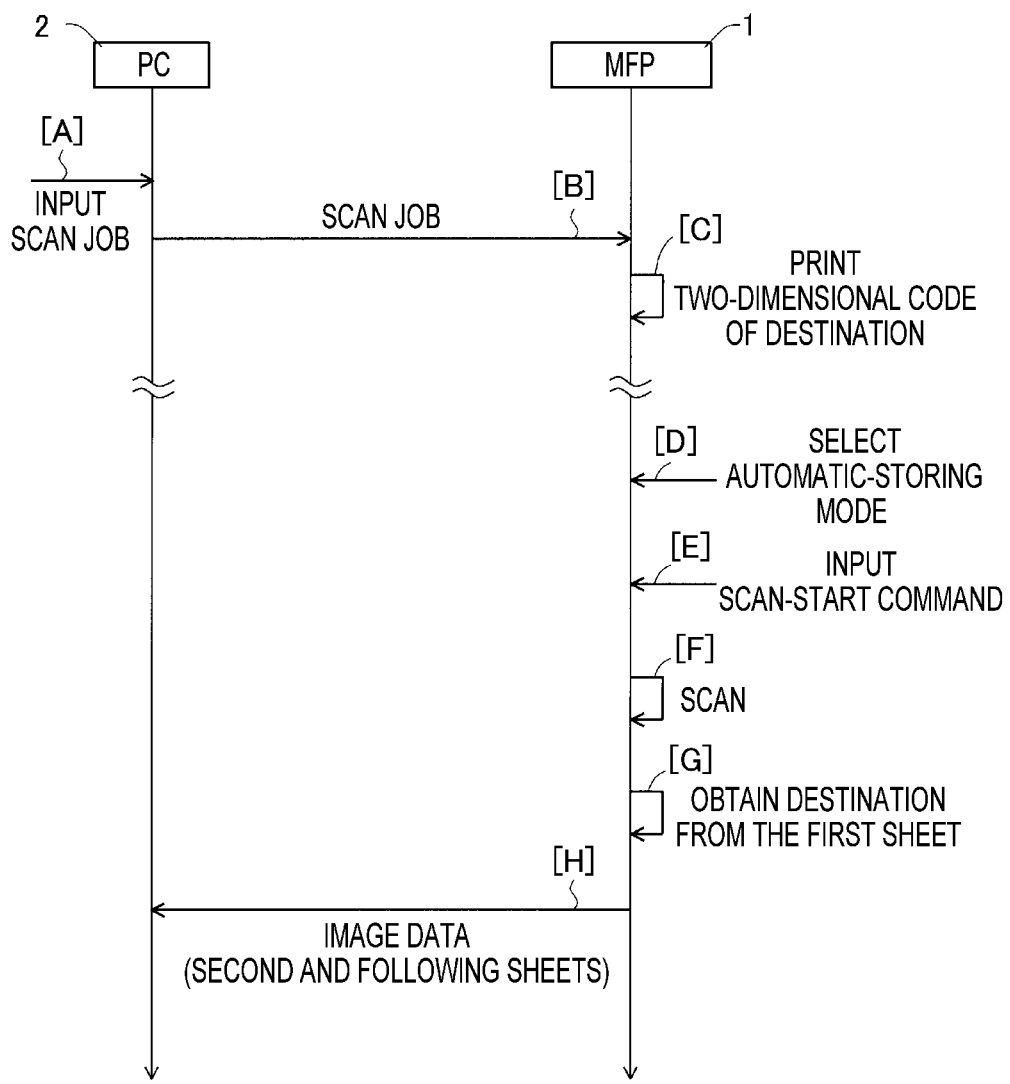
FIG. 2 is a ladder chart to illustrate a sequence of actions in a scan job to be executed in the scanner system according to a first embodiment of the present disclosure.

FIG. 2 is a ladder chart to illustrate a sequence of steps in a scan job, including reading of images and transmission of image data generated from the images, input through the basic reader program 222 in the PC 2. Each of the steps in the ladder chart generally represents a process to be executed by one of the CPUs, i.e., the CPU 11 in the MFP 1 or the CPU 21 in the PC 2, acting in compliance with commands described in the programs stored in the memory therein. The processes to be executed by the CPUs 11, 21 may include control over hardware devices using APIs in the OSes. Meanwhile, in the following description, explicit involvement of the OSes in the actions may be omitted.

In the first embodiment, first, in the PC 2, the reader application 223 receives a read command, which is a command to cause the MFP 1 to read an image, input by a user (FIG. 2, [A]). The reader application 223 receiving the read command inputs a scan job in the basic reader program 22.

In response to the input of the scan job in the basic reader program 222, the basic reader program 222 generates a command for the scan job. The scan job with the command is transmitted to the MFP 1 by use of IPP (FIG. 2, [B]). The scan job may include, for example, parameters being information concerning colors and destination information indicating an intended receiver, to which image data composing the read images is addressed. The destination information may be property information, which may be received from the user through the reader application 223, or an IP address, which may be contained in a packet used for the transmission of the scan job from the PC 2 to the MFP 1.

Figure 3:
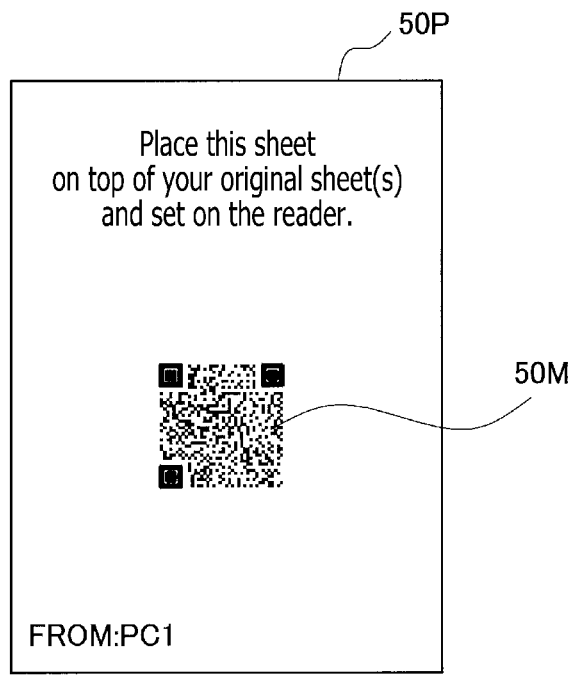
FIG. 3 is an illustrative view of a sheet with a two-dimensional code printed thereon usable in the scanner system according to the embodiments of the present disclosure.

The MFP 1 receiving the scan job from the PC 2 generates a two-dimensional code, which composes the destination information included in the scan job, and print the two-dimensional code on a sheet (FIG. 2, [C]). FIG. 3 illustrates a sheet 50P, on which the two-dimensional code 50M is printed. The two-dimensional code 50M may be, for example, QR code (registered trademark). Optionally, information such as, for example, an explanatory image to explain how to use the sheet 50P and/or user information contained in the scan job, i.e., information concerning the destination of the image data, may be printed on the sheet 50P additionally to the two-dimensional code 50M. With the additional information printed on the sheet 50P, trouble causable by the user who may not be familiar with the procedure of the scan job may be restrained, and the sheet 50P may be prevented from being discarded by the user who may regard the sheet 50P unnecessary. Moreover, with the user information printed on the sheet 50P, an owner of the sheet 50P may be identified, and the sheet 50P may be prevented from being used or discarded by an incorrect user.

The user who has input the read command in the PC 2 may thereafter move to the MFP 1 carrying one or more original sheets in his/her hand. The user move to the MFP 1 may switch an operation mode of the MFP 1 to an automatic-storing mode (FIG. 2, [D]). The automatic-storing mode may be an operation mode, in which the MFP 1 is feasible to execute the received scan job, i.e., the scan job received from the basic reader program 222. The MFP 1 may receive a command that indicates whether the operation mode should be shifted to the automatic-storing mode. Optionally, in order to reduce loads on the user, the MFP 1 may be automatically switched to the automatic-storing mode and stay in the automatic-storing mode for a predetermined length of time after receiving the scan job.

Moreover, the MFP 1 is feasible to accept input of a scan-start command, which may be entered by the user's operation and causes the MFP 1 to start reading of images ([E] in FIG. 2). Before the user operates the MFP 1 to enter the scan-start command, the user may pick up the sheet 50P with the two-dimensional code 50M printed thereon, place the sheet 50P on top of the original sheet(s), and set a stack of the original sheets including the sheet 50P on an original placement bin.

Figure 4:
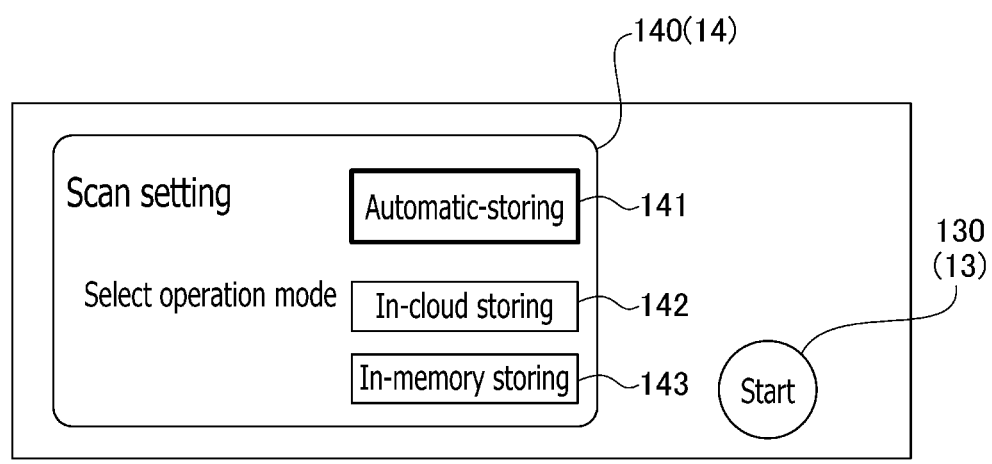
FIG. 4 is an illustrative view of a mode-selectable screen to be displayed in the image reading apparatus according to the embodiments of the present disclosure.

As shown in FIG. 4, the MFP 1 may have a start button 130, and an operation panel including a touch panel 140. The start button 130 may be a part of the input device 13 (see FIG. 1), and the touch panel 140 may be a part of the input device 13 and a part of the display device 14 (see FIG. 1). The start button 130 is a button, through which the user may enter the scan-start command. The touch panel is a device, through which selection for an operation mode may be entered. On a screen of the touch panel, an automatic-storing button 141, through which selection of the automatic-storing mode may be entered, an in-cloud storing button 142, through which selection of an in-cloud storing mode to store the image data in a cloud server may be entered, and an in-memory storing button 143, through which selection of an in-memory storing mode to store the image data in a memory accessible to the MFP 1 may be entered, and the user may select one of the operation modes through one of the buttons 141-143. Optionally, the selected one of the buttons 141-143 may be highlighted so that the selected button may be distinguished from the unselected buttons. FIG. 4 shows an appearance of the touch panel 140, in which the automatic-storing mode is being selected. While the automatic-storing mode is being selected, and when the user operates the start button 130, the scan-start command for the automatic-storing mode may be entered.

When the scan-start command is input in the MFP 1 operating in the automatic-storing mode, the MFP 1 may start reading an image (FIG. 2 [F]). Optionally, the MFP 1 may display a message to the user on the touch panel 140 to confirm that the sheet 50P is set on top of the original sheets before starting to read the images and may start reading after the MFP 1 receives a confirmation from the user. While the first one of the sheets set in the MFP 1 is the sheet 50P, the MFP 1 starting to read the images may extract the two-dimensional code 50M from the image of the first sheet and obtain the destination information from the extracted two-dimensional code 50M (FIG. 2, [G]).

The MFP 1 after reading the first sheet may continue reading the second sheet and further sheet(s), if any. In particular, the MFP 1 may generate image data for the second and further sheets and transmit the generated image data to the destination indicated in the destination information obtained from the image data of the first sheet (FIG. 2, [H]).

It may be noted that the destination of the image data may not necessarily be limited to the PC 2, as shown in FIG. 2, but may be another device different from the PC 2. For example, the destination may be an external storage device such as a storage server or a cloud storage. Meanwhile, in the case where the PC 2 is designated to be the destination, a shared storage area in the PC 2 accessible to the MFP 1 may be designated as the storage destination. Alternatively, an unshared area in the PC 2 may be designated as the destination. In such a case, access information, such as account information and/or a token, which are necessary for the MFP 1 to access the unshared area, may be included in the destination information.

Moreover, while contents in a two-dimensional code may be obtained easily by a user from a third party through a mobile device such as a smartphone, in the case where the access information is included in the two-dimensional code, the contents in the two-dimensional code may be encrypted for security. In this arrangement, for example, the MFP 1 may decrypt the information obtained from the two-dimensional code 50M and obtain the destination from the decrypted information. For another example, the destination information related with identifying information may be stored in advance in the MFP 1, and the identifying information may be included in the two-dimensional code 50M.

Optionally, the actions to read the first sheet and the second and following sheets may not necessarily be conducted continuously. For example, after reading the first sheet, the MFP 1 may pause before reading the second sheet and display the destination indicated by the destination information obtained from the image of the first sheet on the touch panel 140. The user viewing the displayed destination information may enter approval or denial for transmission of the image data to the displayed destination. When the MFP 1 receives approval from the user, the MFP 1 may restart reading the images of the second and further sheets and transmit the image data from the images of the original sheets to the destination.

Next, among the actions in the scan job as shown in FIG. 2 according to the first embodiment of the present disclosure, steps to be conducted in the MFP 1 will be described below. In particular, the steps to be conducted in the MFP 1 may be categorized into a scan-job receiving process, which may be conducted by the CPU 11 when the scan job is received, and a scan-job starting process, which may be conducted by the CPU 11 in order to read the images.

Figure 5:
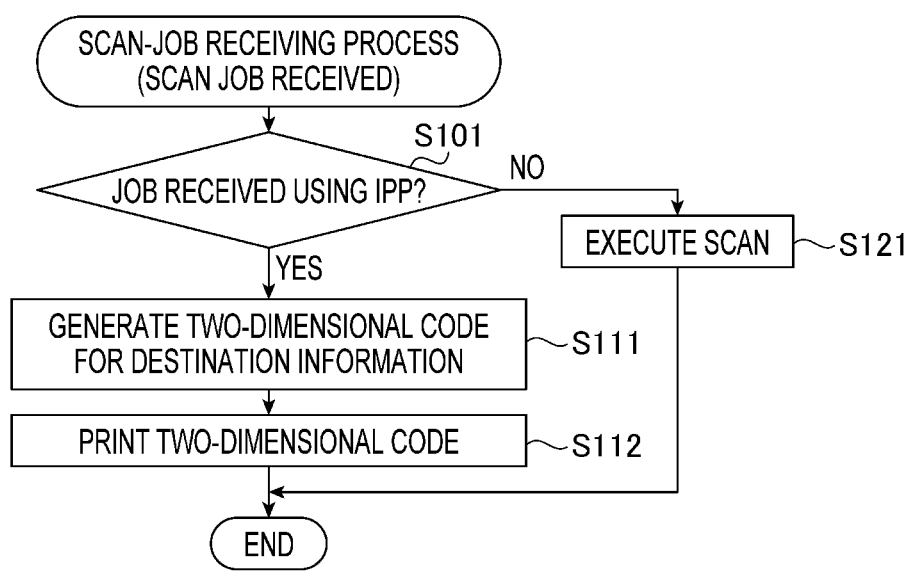
FIG. 5 is a flowchart to illustrate flows of steps in a scan-job receiving process to be executed in the image reading apparatus according to the first embodiment of the present disclosure.

First, the scan-job receiving process will be described with reference to FIG. 5. The scan-job receiving process may be conducted in response to receiving of a scan job from the basic reader program 222 (FIG. 2, [B]) and includes a process to print the two-dimensional code 50M (FIG. 2, [C]).

As the scan-job receiving process starts, in S101, the CPU 11 determines whether the protocol used for receiving the scan job was IPP. IPP is, as mentioned above, a protocol used in the basic reader program 222 and is different from a protocol to be used in a scanner driver. Therefore, by determining whether the protocol having been used is IPP or not, the CPU 11 may determine whether the scan job currently received is a scan job received from the basic reader program 222 or from the scanner driver.

If the protocol used for receiving the scan job was IPP (S101: YES), in S111, the CPU 11 generates the two-dimensional code 50M composing the destination information included in the scan job. In S112, the CPU 11 controls the printer device 17 to print an image containing the two-dimensional code 50M generated in S111. Thereby, the sheet 50P with the two-dimensional code 50M printed thereon is output from the MFP 1. The scan-job receiving process ends after S112. In this regard, when the scan job was received through IPP, the MFP 1 may not start the image-reading action immediately but may be suspended from the image-reading action.

On the other hand, when the scan job was received through a protocol different from IPP (S101: NO), in S121, the CPU 11 controls the reader device 16 to read an image of an original sheet set on the original placement bin. A protocol different from IPP may be, for example, a protocol to be used by a driver program designed for the MFP 1 or a protocol to be used by an application program that does not involve the basic reader program 222. If no original sheet is set on the original placement bin, the MFP 1 may either wait until an original sheet is set or determine that an error occurred and abort the image-reading action.

If the sender device of the scan job has a printer driver installed therein, it may be likely that the sender supports the push-scanning function. In this regard, if the print job was output from the sender device, which supports the push-scanning function, it may be likely that the user entered the scan command while the original sheet is already set on the original placement bin. Therefore, if the scan job was received through a protocol different from IPP, the MFP 1 may start the image-reading action immediately. The MFP 1 may transmit the image data obtained as a result of the image-reading action to any of: a destination based on the destination information included in the scan job, the PC 2 being the sender of the scan job, and a storage location set in advance in the MFP 1. After S121, the CPU 11 ends the scan-job receiving process.

Meanwhile, the basic reader program 222 may be enabled to append immediate read-start information, which indicates the image-reading action is to be started immediately, to the scan job. Therefore, if the scan job was received through IPP, in other words, if the scan job was received from the basic reader program 222 through IPP, the scan job may contain the immediate read-start information. In such a case, the CPU 11 may proceed from S101 to S121, without generating the two-dimensional code 50M in S111, to start the image-reading action.

Moreover, the MFP 1 may be optionally adapted to a setting, which enables immediate start of the image-reading action. Therefore, if the scan job was received through IPP, and if the MFP 1 is adapted to the immediate start setting, the CPU 11 may act in compliance with the immediate start setting and proceed from S101 to S121, without generating the two-dimensional code 50M in S111, to start the image-reading action.

Figure 6:
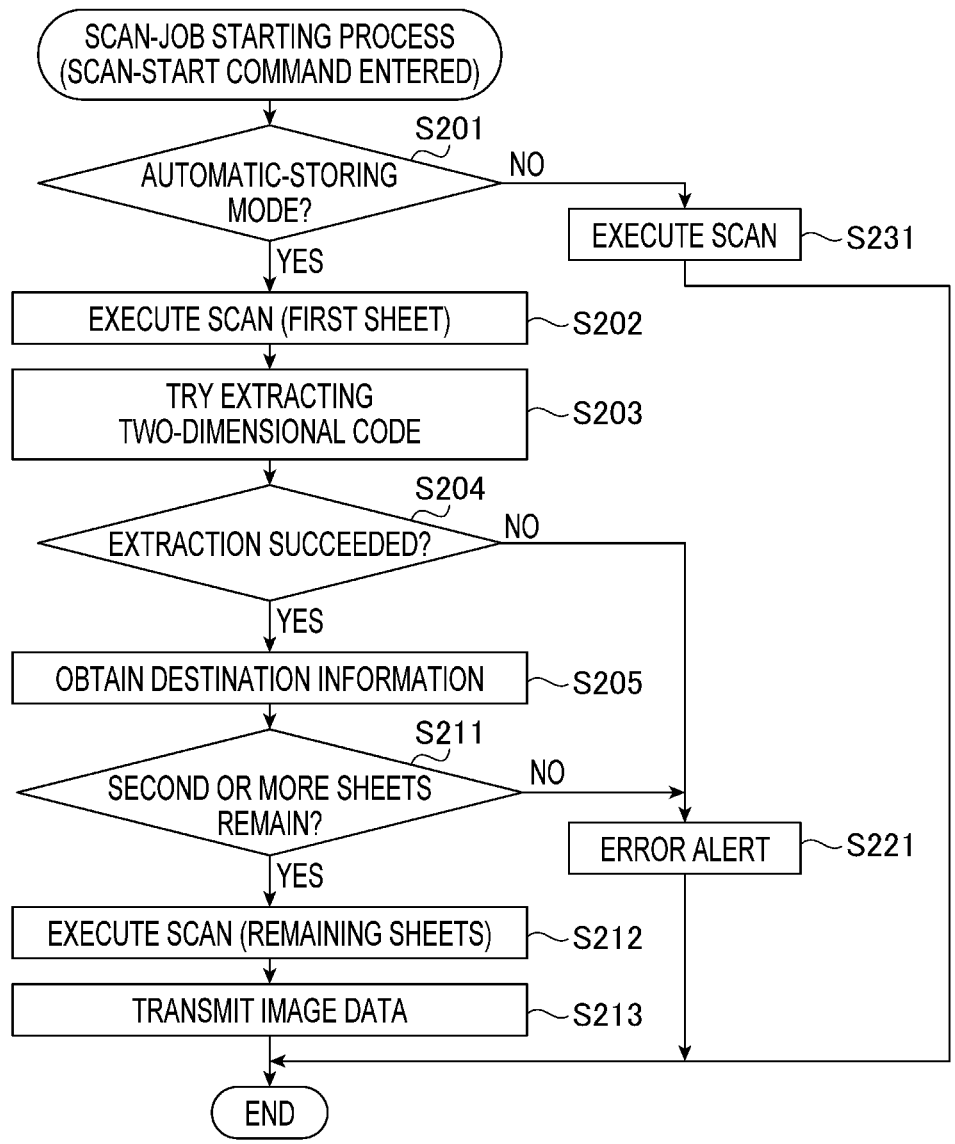
FIG. 6 is a flowchart to illustrate flows of steps in a scan-job starting process to be executed in the image reading apparatus according to the first embodiment of the present disclosure.

Next, the scan-job starting process will be described with reference to FIG. 6. The scan-job starting process may be conducted in response to entry of the scan-start command, which is indicated by arrow [E] in FIG. 2, and includes a process to obtain the destination information, which is indicated by arrow [G] in FIG. 2, and a process to transmit the image data, which is indicated by arrow [H] in FIG. 2.

As the scan-job starting process starts, in S201, the CPU 11 determines whether the operation mode is set to the automatic-storing mode. If the operation mode is set to the automatic-storing mode (S201: YES), in S202, the CPU 11 controls the reader device 16 to read an image of the first sheet from the sheet stack set on the original placement bin.

According to the procedure in the present embodiment, it is assumed that the user has set the stack of original sheets on the original placement bin with the sheet 50P placed on top thereof. Therefore, in S203, the CPU 11 attempts to extract the two-dimensional code 50M from the image data obtained by the image-reading action to the first sheet. In S204, the CPU 11 determines whether the two-dimensional code 50M was successfully extracted. If the two-dimensional code 50M was successfully extracted (S204: YES), in S205, the CPU 11 obtains the destination information contained in the extracted two-dimensional code 50M.

After the determination in S204 that the two-dimensional code 50M was successfully extracted (S204: YES), and following S205, in S211, the CPU 11 determines whether another sheet remains on the original placement bin. In other words, the CPU 11 determines whether the stack of original sheet contained a second or further sheet(s). If at least the second sheet remains on the original placement bin (S211: YES), in S212, the CPU 11 controls the reader device 16 to continuously read the image of the remaining sheet(s) on the original placement bin.

After completion of the image-reading action to read the images of the original sheet(s), in S213, the CPU 11 transmits the image data generated from the second sheet, and further sheet(s) if any, in S212 to the destination indicated in the destination information obtained in S205. The scan-job starting process ends after S213.

On the other hand, in S211, if no sheet remains on the original placement bin (S211: NO), in S221, the CPU 11 notifies the user of an error that no original sheet is set on the original placement bin and ends the scan-job starting process. The CPU 11 may notify the user of the error by, for example, displaying a message or an error code on the touch panel 140, outputting audio guidance, and/or generating an error log and storing the error log in the memory 12.

Moreover, when the CPU 11 failed to extract the two-dimensional code 50M in S204 (S204: NO), in S221, the CPU 11 may alert the user of an error that the sheet 50P with the two-dimensional code 50M printed thereon is not set on the original placement bin and ends the scan-job starting process. The CPU 11 may determine that extraction of the two-dimensional code 50M failed when, for example, not only the CPU 11 was unable to extract the two-dimensional code 50M from the image data of the first sheet, but also, for another example, when the two-dimensional code 50M read from the sheet 50P does not contain the destination information, in other words, when the CPU 11 was unable to obtain the destination information or unable to detect the destination in the destination information.

Meanwhile, in S201, if the operation mode is not set to the automatic-storing mode (S201: NO), it may be assumed that the scan-scan command is not in compliance with the procedure according to the present embodiment. Therefore, in S231, the CPU 11 controls the reader device 16 to read the images of the original sheets without discriminating the first sheet from the other sheets in the stack on the original placement bin. The MFP 1 may transmit the image data obtained as a result of the image-reading action to any of: a destination based on the destination information included in the scan job, the PC 2 being the sender of the scan job, and a storage location set in advance in the MFP 1. The image data obtained through this image-reading action composes image data of the stacked original sheets starting from the first sheet. After S231, the CPU 11 ends the scan-job starting process.

According to the processes described above, even when the scan job is received through the basic reader program 222, in order to store the image data composing the images of the original sheets in a desired destination, the user may enter the scan command through the PC 2, move to the MFP 1 along with the original sheets, sets the original sheets together with the sheet 50P on the original placement bin, and continuously enter the scan-start command to the MFP 1 without returning to the PC 2. In other words, the user may move only for once to the MFP 1 to obtain the image data. Therefore, while the user's burden may be reduced, the quasi-push-scanning operation may be accomplished.

Second Embodiment

Figures 7, 8:
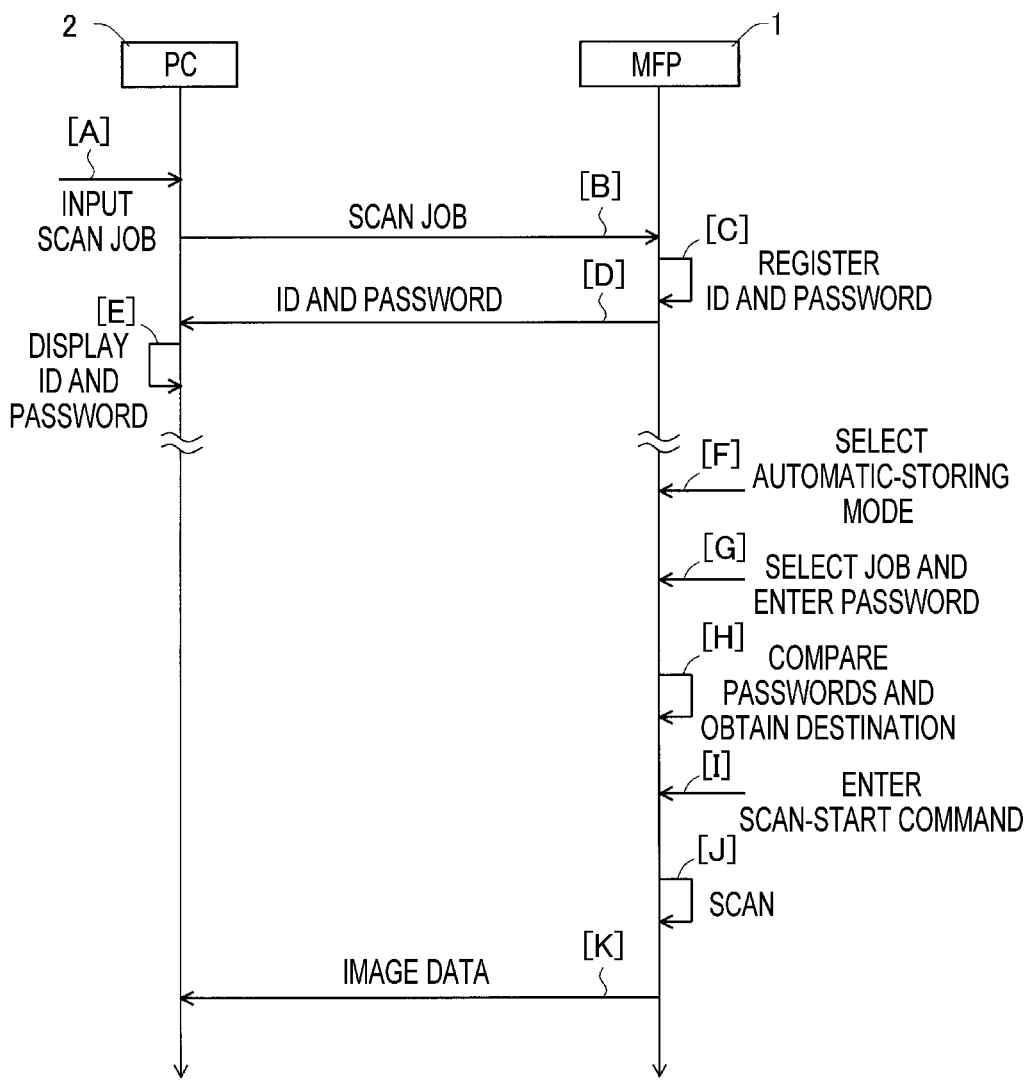
FIG. 7 is a ladder chart to illustrate a sequence of actions in a scan job to be executed in the scanner system according to a second embodiment of the present disclosure.
FIG. 8 is an illustrative view of a database to store information concerning scan jobs according to the embodiments of the present disclosure.

FIG. 7 is a ladder chart to illustrate a sequence of steps in a scan job, including reading of images and transmission of image data generated from the images, input through the basic reader program 222 in the PC 2. The process sequence in the second embodiment is different from the process sequence in the first embodiment in that no two-dimensional code 50M containing the destination information is printed, but the user is required to input an ID and a password in the MFP 1 before scanning the images.

According to the second embodiment, first, similarly to the first embodiment, a scan job is entered by the user's operation in the basic reader program 222 (FIG. 7, [A]). The entered scan job is passed from the basic reader program 22 to the MFP 1 in compliance with IPP (FIG. 7, [B]).

The MFP 1 receiving the scan job from the PC 2 issues an identifying number (ID) to the received scan job and randomly generates a password. The ID and the password are associated with the destination information contained in the scan job and stored in the memory 12 (FIG. 7, [C]). In particular, the memory 12 of the MFP 1 is provided with a scan job database (DB) 121, as shown in FIG. 8, and the destination information, the ID, the password, and a registration date are associated with one another and registered as a record in the scan job DB 121. Thus, the MFP 1 may register the received scan job as a record in the scan job DB 121. Optionally, a same destination may not always be provided with different passwords on the scan job basis, but the same destination may be provided with a fixed password. In other words, a fixed password may be provided on the destination basis.

Moreover, the MFP 1 transmits the ID and the password assigned to the scan job to the PC 2 being the sender of the scan job (FIG. 7, [D]). The PC 2 may receive the ID and the password from the MFP 1 and display the received ID and the password in the display device 24 through the reader application 223 (FIG. 7, [E]). Thereby, the user may obtain the ID and the password for the scan job. Optionally, when the PC 2 is set to have the fixed password, the steps [D] and [E] in FIG. 7 may be omitted.

The user who has entered the read command in the PC 2 may thereafter move to the MFP 1 carrying the original sheet(s) in his/her hand. The user reaching the MFP 1 may switch the operation mode of the MFP 1 to the automatic-storing mode (FIG. 2, [F]). The MFP 1 may display a list of IDs associated with scan jobs that are registered as records in the scan job DB 121 in the touch panel 140. The MFP 1 may receive selection of the ID associated with the scan job to be executed and further receive the password associated with the scan job (FIG. 7, [G]).

For example, when the MFP 1 receives the selection of the automatic-storing mode through the operation to the automatic-saving button 141, the MFP 1 may switch the screens in the touch panel 140, from the mode selectable screen, through which one of the operation modes is selectable, to a scan-job selective screen, through which one of the scan jobs is selectable. Through the scan-job selective screen, the list of the scan job registered as records in the scan job DB 121 may be displayed, and the user's operation to select one of the scan jobs may be entered. When the user's operation to select one of the scan jobs is entered, the MFP 1 may switch the screen in the touch panel 140 from the scan-job selectable screen to a screen, through which the password may be entered. Meanwhile, if no scan job has been received in the MFP 1, in other words, when no ID is registered as a record in the scan job DB 121, the automatic-storing mode may be restricted from being presented to the user to be selectable.

When the password is entered, the MFP 1 may compare the entered password with the password in the registered record in the scan job DB 121 to authenticate the scan job. When the scan job is authenticated, the MFP 1 may read the destination information associated with the authenticated scan job in the scan job DB 121 and obtains the destination information (FIG. 7, [H]). Thus, the MFP 1 requires entry of the password by the user so that the user may be restrained from using an incorrect scan job erroneously or maliciously.

Further, the MFP 1 may receive entry of the scan-start command for the selected scan job by the user (FIG. 7, [I]). Optionally, the MFP 1 may accept the entry of the scan-start command before the user enters the selection of the scan job. In this arrangement, the MFP 1 may receive the entry of the selection of the scan job, in other words, entry of the ID and the password, after the entry of the scan-start command.

When the scan job is authenticated, and the scan-start command is entered, the MFP 1 may start the image-reading action (FIG. 7, [J]). The order of sequence for the authentication of the scan job and the entry of the scan-start command may not necessarily be fixed, but the scan-start command may be entered first and the scan job may be authenticated later, or vice versa. In other words, the MFP 1 may request for the entry of the password after the scan job is selected and the scan-start command is entered. Thereafter, the MFP 1 may transmit the image data composing the images of the original sheets to the destination indicated in the obtained destination information (FIG. 7, [K]). After transmitting the image data completely, the MFP 1 may delete the record concerning the scan job from the scan job DB 121.

According to the procedure shown in FIG. 7, the MFP 1 generates the ID and the password and requires the selection of the ID and the entry of the password from the user. However, the MFP 1 may not necessarily generate both the ID and the password but may generate the ID alone. For example, the MFP 1 may generate the ID alone, transmit the ID alone to the PC 2, and request the user to enter the ID alone to start the scan job. In this arrangement, when the user selects the scan job, the MFP 1 may not display the list of IDs registered as a record in the scan job DB 121 but may require the user to enter the ID. The MFP 1 may thereafter search for an ID matching with the entered ID in the record in the scan job DB 121. If the ID matching the entered ID is detected in the scan job DB 121, the MFP 1 may determine that the user is authenticated, and the job associated with the entered ID may be determined as the selected job. If no ID matching the entered ID is found in the scan job DB 121, the MFP 1 may determine that the use is not authenticated.

Next, among the actions in the scan job as shown in FIG. 7 according to the second embodiment of the present disclosure, steps to be conducted in the MFP 1 in will be described below. In particular, similarly to the first embodiment, the steps to be conducted in the MFP 1 may be categorized into a scan-job receiving process and a scan-job starting process. Moreover, a scan-job selecting process, which may be conducted by the CPU 11 in response to the operation mode shifting into the automatic-storing mode, will be described below.

Figure 9:
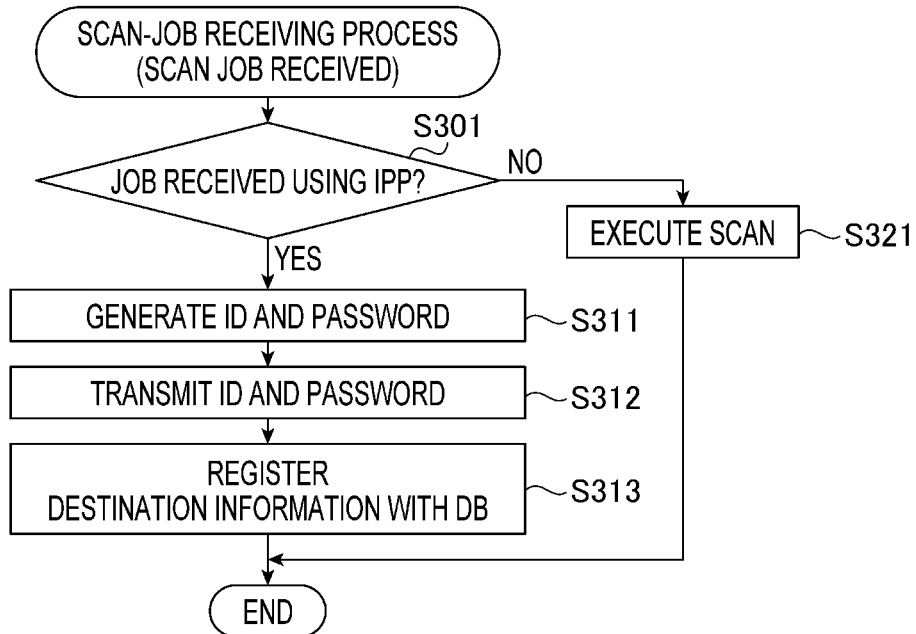
FIG. 9 is a flowchart to illustrate flows of steps in a scan-job receiving process to be executed in the image reading apparatus according to the second embodiment of the present disclosure.

First, the scan-job receiving process will be described with reference to FIG. 9.

The scan-job receiving process may be conducted in response to receiving of a scan job from the basic reader program 222 (FIG. 2, [B]) and includes a process to generate the ID and the password (FIG. 7, [C]) and a process to transmit the ID and the password to the PC 2 (FIG. 7, [D]).

As the scan-job receiving process starts, in S301, the CPU 11 determines whether the protocol used for receiving the scan job was IPP. If the scan job was received through a protocol different from IPP (S301: NO), in S321, the CPU 11 controls the reader device 16 to read an image of an original sheet set on the original placement bin and ends the scan-job receiving process. In this context, an image of an original sheet may include two or more images of two or more original sheets.

If the protocol used for receiving the scan job was IPP (S301: YES), in S311, the CPU 11 generates an ID and a password for the received scan job. In S321, the CPU 11 transmits the generated ID and the password to the PC 2 being the sender of the scan job. In S313, the CPU 11 registers the generated ID and the password with the scan job DB 121 in association with the destination information contained in the received scan job. After S313, the CPU 11 ends the scan-job receiving process.

Meanwhile, the basic reader program 222 may be enabled to append immediate read-start information, which indicates the image-reading action is to be started immediately, to the scan job. Therefore, if the scan job was received through IPP, in other words, if the scan job was received from the basic reader program 222 through IPP, the scan job may contain the immediate read-start information. If the scan job contains the read-start information, the CPU 11 may proceed from S301 to S321, without generating the ID or the password in S311 to start the image-reading action to read the image of the original sheet.

Moreover, the MFP 1 may be optionally adapted to a setting, which enables immediate start of the image-reading action. Therefore, if the scan job was received through IPP, and if the MFP 1 is adapted to the immediate start setting, the CPU 11 may act in compliance with the immediate start setting and proceed from S101 to S321, without generating the ID or the password in S311, to start the image-reading action to read the image of the original sheet.

Figure 10:
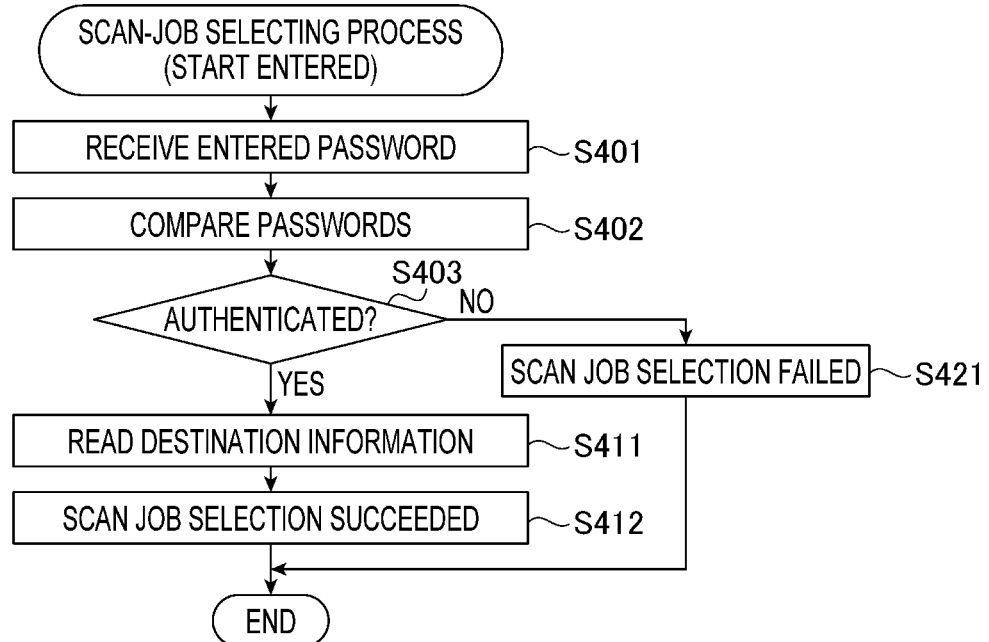
FIG. 10 is a flowchart to illustrate flows of steps in a scan-job selecting process to be executed in the image reading apparatus according to the second embodiment of the present disclosure.

Next, the scan-job starting process will be described with reference to FIG. 10. The scan-job starting process may be conducted in response to entry of the ID and the password, which is indicated by arrow [G] in FIG. 7, and includes the action to obtain the destination information, which is indicated by the arrow [H] in FIG. 7. In particular, the MFP 1 may display the list of IDs associated with scan jobs that are registered as records in the scan job DB 121 in the touch panel 140 and receive selection of the ID associated with the scan job to be executed. In response to the user's operation to the start button 130 while one of the IDs in the list is selected, the scan-job selecting process may start. Optionally, in a case where solely one scan job is registered with the scan job DB 121, the MFP 1 may omit the step to receive the selection of the ID from the user, but the scan-job selecting process may be conducted in response to the user's operation to the start button 130.

As the scan-job starting process starts, in S401, the CPU 11 receives the password corresponding to the selected ID entered by the user. After receiving the password, in S402, the CPU 11 reads the password associated with the selected ID from the scan job DB 121 and compares the password read from the scan job DB 121 with the entered password to authenticate the entered password. In particular, in S402, if the password read from the scan job DB 121 matches the entered password, the CPU 11 may determine that the entered password is correct, but if the password read from the scan job DB 121 does not match the entered password, the CPU 11 may determine that the entered password is incorrect. In S403, the CPU 11 may determine whether the password is successfully authenticated or not.

If the CPU 11 determines that the password is authenticated (S403: YES), in S411, the CPU 11 reads and obtains the destination information associated with the selected ID from the scan job DB 121. In S412, the CPU 11 outputs information indicating that the scan job is successfully selected and ends the scan-job selecting process.

On the other hand, if the CPU 11 determines that the password is not authenticated (S403: NO), in S421, the CPU 11 outputs information indicating the user failed to select the correct scan job and ends the scan-job selecting process. Moreover, if the user enters no password and the CPU 11 times out, the CPU 11 may determine that the user failed to enter the correct password as well.

Figure 11:
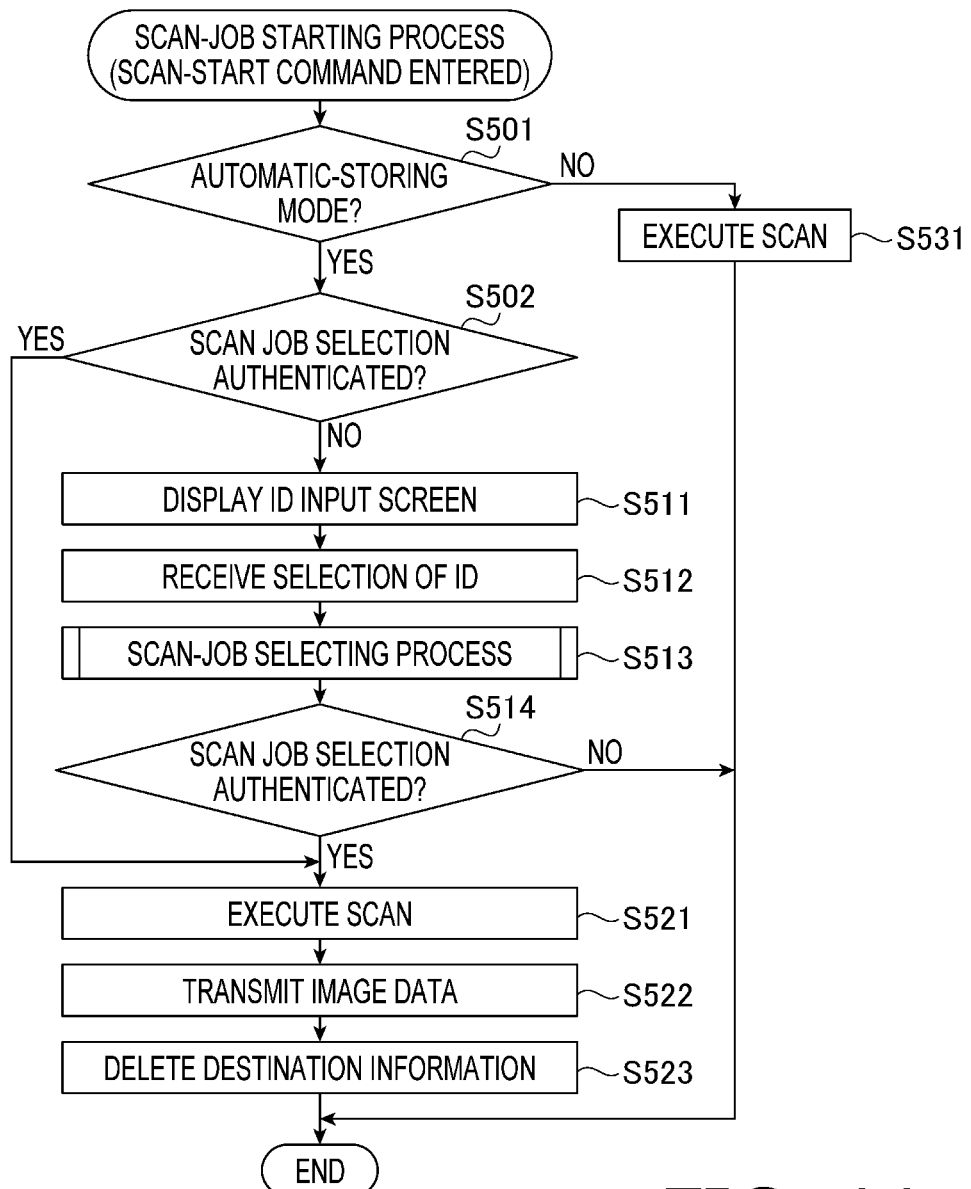
FIG. 11 is a flowchart to illustrate flows of steps in a scan-job starting process to be executed in the image reading apparatus according to the second embodiment of the present disclosure.

Next, the scan-job starting process will be described with reference to FIG. 11. The scan-job starting process may be conducted in response to entry of the scan-start command, which is indicated by arrow [I] in FIG. 7, and includes a process to read the image of the original sheet, which is indicated by arrow in FIG. 7, and a process to transmit image data, which is indicated by arrow [C] in FIG. 7.

As the scan-job starting process starts, in S501, the CPU 11 determines whether the operation mode is set to the automatic-storing mode. If the operation mode is not set to the automatic-storing mode (S501: NO), in S531, the CPU 11 does not require the user to enter the ID or the password but control the reader device 16 to read the image of the original sheet. After S531, the CPU 11 ends the scan-job starting process.

If the operation mode is set to the automatic-storing mode (S501: YES), in S502, the CPU 11 determines whether the scan job is correctly selected, and whether the scan job is authenticated. As mentioned above, according to the present embodiment, the scan-start command may be entered before the scan job is selected. Therefore, at the time when the scan-start command is entered, the scan job may not be selected or authenticated yet.

Therefore, if no scan job is selected yet, or the scan job is selected but the selected scan job is not yet authenticated (S502: NO), in S511, the CPU 11 displays the list of the IDs associated with scan jobs that are registered with the scan job DB 121 in the touch panel 140. In S512, the CPU 11 may receive the user's selection being one of the IDs associated with the job to be executed. In S513, the CPU 11 conducts the scan-job selecting process described above. In S514, the CPU 11 determines whether the scan job is correctly selected, and whether the scan job is authenticated. If no scan job is selected yet, or the scan job is selected but the selected scan job is not yet authenticated even after S513 (S514: NO), the CPU 11 terminates the scan-job starting process without starting the image-reading action.

If a scan job is selected, and the selected scan job is authenticated (S502: YES/S504: YES), in S521, the CPU 11 controls the reader device 16 to read the images of the original sheet set on the original placement bin.

After completion of the image-reading action to read the images of the sheet, in S522, the CPU 11 transmits the image data of the image read in S521 to the destination indicated in the destination information obtained in S411. After S522, in S523, the CPU 11 deletes the record concerning the completed scan job from the scan job DB 121. The scan-job starting process ends thereafter.

According to the processes described above, even when the scan job is received by the basic reader program 222, in order to store the image data from the original sheet in the desired destination, the user may enter the scan command through the PC 2, move to the MFP 1 along with the original sheet, sets the original sheet on the original placement bin, and continuously enter the scan-start command to the MFP 1 without returning to the PC 2. In other words, the user may move only for once to the MFP 1 to obtain the image data. Therefore, while the user's burden may be reduced, the quasi-push-scanning operation may be accomplished.

Moreover, according to the second embodiment, the two-dimensional code 50M is not printed on the sheet 50P. Therefore, if the scanner is a single-functioned apparatus not having the printing function, the scanner may still provide the process described in the second embodiment. Further, while no two-dimensional code 50M is printed on the sheet 50P, consumable material may be saved. Meanwhile, according to the first embodiment, the user is not required to select a scan job or enter a password. In this regard, compared to the second embodiment, the burden on the user to operate the MFP 1 may be reduced.

Although examples of carrying out the invention has been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the image reading apparatus is not necessarily limited to the MFP but may be, for example, a single-functioned reading apparatus such as a scanner, as long as the apparatus is equipped with the image reading function. For another example, the information processing apparatus, through which the user enters the scan job, may not necessarily be limited to the PC but may be, for example, a mobile device such as a smartphone.

For another example, some or all of the steps or the processes conducted in the flowcharts described above and shown in the accompanying drawings may optionally be conducted in different orders or in parallel with one another as long as the processed results do not collide or contradict with one another.

For another example, the steps or the processes in the scanner system 100 described above may be accomplished by a single CPU, a plurality of CPUs, a hardware device such as an ASIC, or a combination of any of these. For another example, the steps or the processes in the above-described embodiments may be accomplished by various media or methods, including a recording medium storing the programs to implement the steps or the processes.

What is claimed is:

1. An image reading apparatus, comprising:
   a reader device;
   a communication interface;
   a user interface; and
   a controller configured to:
      receive a job to cause the reader device to read an image of an original from an information processing apparatus through the communication interface using one of a specific protocol and a protocol other than the specific protocol, the specific protocol being a protocol to be used in a basic reader program incorporated in an operating system in the information processing apparatus, the job including information indicating a destination of image data;
      in a case where the job is received by use of the protocol other than the specific protocol, cause the reader device to start reading the image; and
      in another case where the job is received by use of the specific protocol,
         record the information included in the job indicating the destination of the image data without causing the reader device to start reading the image; and
         after recording the information included in the job indicating the destination of the image data, in response to receiving of an execution command to execute the job through the user interface, cause the reader device to start reading the image, obtain the destination of the image data for the image having been read from the recorded information, and transmit the image data for the image to the obtained destination.

2. The image reading apparatus according to claim 1, further comprising:
   a printer device,
   wherein the controller is configured to, in the another case where the job is received by use of the specific protocol:
      record the information indicating the destination of the image data included in the job by causing the printer device to print a two-dimensional code on a sheet, the two-dimensional code being generated based on the information included in the received job indicating the destination of the image data; and
      cause the reader device to start reading images of sheets being the original, and after the reader device starts reading the images, extract the two-dimensional code from the image data for an image of a first one of the sheets having been read firstly and specify the destination in the extracted two-dimensional code to obtain the destination, and transmit the image data for the image of the other of the sheets having been read later than the first one of the sheets to the obtained destination.

3. The image reading apparatus according to claim 2, wherein, in one of cases where the controller is unable to extract the two-dimensional code from the image data for the image of the first one of the sheets and where the controller is unable to specify the destination in the extracted two-dimensional code, the controller is configured to output error information indicating that the controller failed to specify the destination.

4. The image reading apparatus according to claim 2, wherein the image reading apparatus is operable in one of operation modes including a first mode, in which the controller is feasible to accept the execution command for the job including the recorded information indicating the destination of the image data, and a second mode, in which the controller is infeasible to accept the execution command for the job, and
   wherein the controller is configured to, when operating in the first mode, after recording the information indicating the destination of the image data by printing, and in response to receiving of the execution command, cause the reader device to start reading the images of the sheets, obtain the destination specified in the two-dimensional code extracted from the image data for the image of the first one of the sheets, and transmit the image data for the image of the other of the sheets having been read later than the first one of the sheets to the obtained destination; and
   wherein the controller is configured to, when operating in the second mode, in response to receiving of a read command to cause the reader device to read the image through the user interface, cause the reader device to start reading the image of the original including at least a first sheet and transmit the image data for the image having been read without attempting to extract the two-dimensional code from the image data for the image of the first sheet.

5. The image reading apparatus according to claim 1, wherein the controller is configured to, in the another case where the job is received by use of the specific protocol:
   record the information included in the job indicating the destination of the image data in a memory in the image reading apparatus in association with identifying information identifying the job, and
   in response to receiving selection for one of jobs recorded in the memory and the execution command, read the information indicating the destination associated with the identifying information identifying the selected one of the jobs to obtain the destination of the image data for the image having been read and transmit the image data for the image to the obtained destination.

6. The image reading apparatus according to claim 5, wherein the controller is configured to, in the another case where the job is received by use of the specific protocol:
   generate authentication information for the received job and transmit the generated authentication information to the information processing apparatus,
   record the generated authentication information in the memory in association with the identifying information,
   in response to receiving the selection of the one of the jobs recorded in the memory and the execution command, require the authentication information to be entered through the user interface and compare the entered authentication information with the authentication information recorded in association with the identifying information in the memory, and in a case where the entered authentication information matches the authentication information recorded in the memory, cause the reader device to start reading the image, but in a case where the entered authentication information differs from the authentication information recorded in the memory, suspend the reader device from starting reading the image.

7. The image reading apparatus according to claim 6,
wherein the controller generates same authentication information fixedly to a same information processing apparatus, and
wherein the controller is configured to omit transmission of the same authentication information to the same information processing apparatus.

8. The image reading apparatus according to claim 5, further comprising a display device,
wherein the controller is configured to, in the another case where the job is received by use of the specific protocol:
generate authentication information and transmit the generated authentication information to the information processing apparatus,
record the generated authentication information in the memory in association with the identifying information,
require, through the display device, the authentication information to be entered through the user interface and compare the entered authentication information with the authentication information recorded in association with the identifying information in the memory, and
in a case where the entered authentication information matches the authentication information recorded in the memory, control the display device to display a list of the jobs recorded in the memory to receive the selection of the one of the jobs recorded in the memory through the user interface, and
in response to receiving the selection of the one of the jobs recorded in the memory through the user interface, accept entry of the execution command, and, in response to the entry of the execution command, cause the reader device to start reading the image.

9. The image reading apparatus according to claim 5,
wherein the controller is configured to delete the selected one of the jobs from the memory after transmitting the image data to the obtained destination.

10. The image reading apparatus according to claim 1,
wherein the controller is configured to, in the another case where the job is received by use of the specific protocol:
record the information included in the job indicating the destination of the image data in a memory in the image reading apparatus in association with identifying information identifying the job and transmit the identifying information to the information processing apparatus,
require the identifying information to be entered through the user interface and, in response to entry of the identifying information, search for the identifying information recorded in the memory that matches the entered identifying information, and
in a case where the identifying information matching the entered identifying information is detected in the memory, determine the job associated with the detected identifying information is selected to be executed, and, in response to the entry of the execution command to the selected job, cause the reader device to start reading the image.

* * * * *